July 28, 1936.    P. S. BAUER    2,049,285

TEMPERATURE METER

Filed Aug. 7, 1931

INVENTOR
*Paul S. Bauer*
BY
*David Rives*
ATTORNEY

Patented July 28, 1936

2,049,285

UNITED STATES PATENT OFFICE 2,049,285

TEMPERATURE METER

Paul Sherman Bauer, Cambridge, Mass., assignor to North Shore News Co., Lynn, Mass., a corporation of Massachusetts Application August 7, 1931, Serial No. 555,851

15 Claims. (Cl. 73—32)

The present invention relates to temperature meters, and its chief object is to provide a new and improved meter that shall measure exceedingly minute temperature variations. Other and further objects will be explained hereinafter and will be particularly pointed out in the appended claims.

Figure 1:
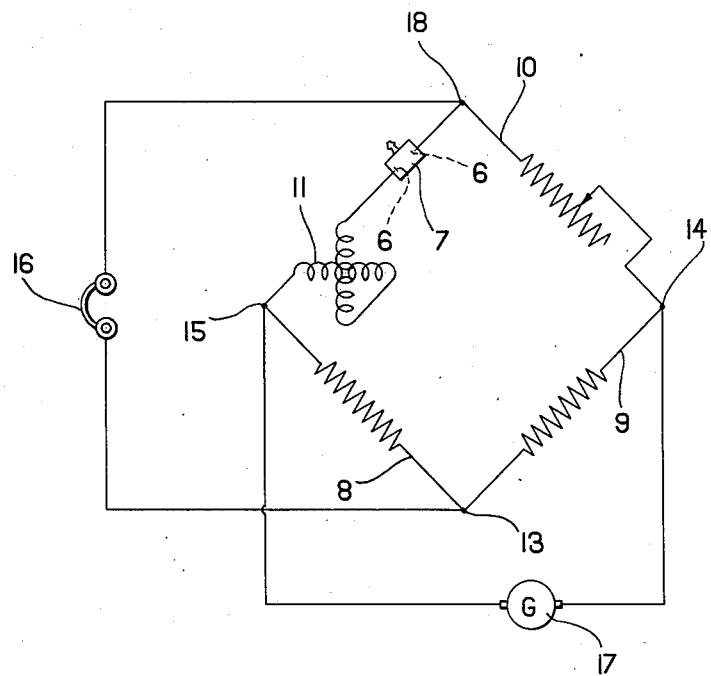
Figure 2:
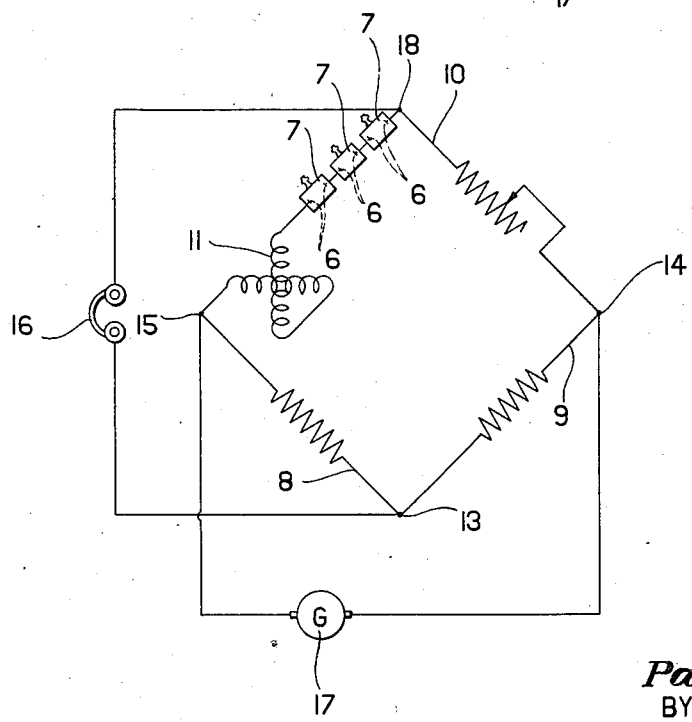

The invention will be more fully explained in connection with the accompanying drawing, in which Fig. 1 is a diagrammatic view of apparatus and circuits constructed and arranged in accordance with the present invention; and Fig. 2 is a similar view of a modification.

The preferred embodiment of the invention illustrated in the drawing comprises a Wheatstone bridge, three arms 8, 9 and 10 of which are constituted of pure resistors. The fourth arm comprises an electrolyte cell 7 and, in series therewith, a reactance, shown as a variometer 11. The electrolyte cell 7 comprises a sealed vessel containing an electrolyte and having sealed thereinto electrodes 6 provided with terminals by which the electrodes are connected in series with the variometer 11. A telephone 16 or other detecting means is connected across two opposite vertices 18 and 13 of the bridge. A source 17 of alternating energy, say, of 1000 cycles, is connected with the other two vertices 14 and 15 of the bridge. The variometer 11 is so adjusted as to neutralize the capacitive reactance of the electrolyte cell 7. As the fourth arm of the bridge is thus in resonance at the frequency of the source 17, the bridge is wholly resistive.

The bridge is then adjusted, as by means of the variable resistance in the arm 10, to obtain a balance, as detected in the telephone 16. The adjustment, either of the variometer 11 or the arm 10, or some other element or elements, will be a measure of the resistance of the electrolyte. This resistance measurement may, in turn, be interpreted as a temperature value. Not only the capacitance of the cell 7, but also its resistance, changes with temperature. It is necessary, therefore, to adjust not only the variometer 11, to neutralize the capacitance of the cell 7, but also the resistance of one of the arms, like the arm 10, to compensate for the new resistance of the cell 7 at the new frequency, and thereby produce a new balance in the telephone 16. Instead of the arm 10, one might adjust the arm 8 or the arm 9 or a combination of the arms. By suitable calibration of either the variometer 11 or the arm 10 (or some other element or elements), therefore, the balance of the bridge may be made to indicate temperature variations, instead of resistance variations, in accordance with the known physical relation between the temperature of the electrolyte and its resistance, the resistance, as is well known, being a function of the temperature. If desired, the arm 10 and the variometer 11 may both be calibrated, the one in terms of ohms and the other in terms of inductance; these calibrations may be converted into corresponding temperature values; both would have to be adjusted to produce a balance of the bridge and they would then both yield the same temperature reading. The change in capacity and the change in resistance of the electrolytic cell 7 produced by a change in temperature are each a measure of the temperature, and either may, therefore, be calibrated to read temperature values. At resonance, the electrolytic cell 7 and the variometer 11 are a pure resistance. The calibration of the variometer 11 (if that were the element to be calibrated) would, therefore, be a measure of the resistance of the electrolyte of the cell 7. By sealing the vessel 7 to prevent evaporation, a permanent temperature cell may be provided, and the reproducibility of the temperature calibrations of the cell may be ensured.

The term "electrolyte" is employed herein, in accordance with generally accepted usage, to designate an aqueous solution of a salt. It is desirable to choose an electrolyte having a relatively high temperature coefficient of conductivity. It is thus possible to correlate temperature changes, through an element whose gradient of electrical response, as a function of temperature, is large, in terms of electrical quantities, whose gradient of electrical response is small; and to effect the correlation as a function of temperature.

A potassium chloride solution, say 0.1 normal, having a 2% coefficient per degree centigrade operates very satisfactorily. The impedance of the resulting cell is a function of various factors, such as the dielectric constant and resistivity of the electrolyte, and the size of the electrodes 6.

The accuracy of the temperature meter may be still further increased by introducing a plurality of cells, preferably of like construction, and preferably all series-connected, in the said fourth arm of the bridge, though this particular arrangement, and these particular details, are by no means essential, as will be understood. The resistance of $n$ cells in series is $n$ times the resistance of a single cell. If the change in resistance of a single cell, due to a given change in temperature, be represented by $t$, therefore, the use of $n$ cells will render it possible to have a change in bridge setting $n$ times as great for the same temperature change $t$. A plurality of cells provides a greater surface than a single cell with the same amount of electrolyte between the same electrodes. The advantage of using a plurality of cells will be appreciated when it is remembered that the resistance and the capacitance each varies as the square of the linear dimension, while the temperature varies as the cube of the same linear dimension. The use of a plurality of cells thus makes it possible to increase the accuracy of the bridge setting corresponding to a given change of temperature.

The applications of the invention are numerous, wherever it is desired to obtain accurate measurements of temperature variations. Thus, it may be used to control the temperature of a chemical bath, to measure radiations, to measure the heat produced by physiological changes, and in many other situations where present-day temperature measurements are not sufficiently accurate or convenient.

If one were to measure the temperature of a chemical bath, for example, one would immerse the cell 7 of Fig. 1 or the cells 7 of Fig. 2 in the bath. One would then adjust the bridge until a balance were obtained, as evidenced in the telephone 16. At that balance, the capacitance of the cell or cells 7 would be entirely neutralized by the inductance of the variometer 11. The adjustment of the bridge would indicate, by suitable calibration, the temperature of the bath.

Modifications will occur to persons skilled in the art, and all such are considered to fall within the spirit and scope of the invention, as defined in the appended claims.

What is claimed is:

1. A temperature-measuring device of the Wheatstone-bridge type comprising three non-reactive impedances, one in each of three arms of the bridge, a temperature-responsive capacitance having a relatively high temperature coefficient of conductivity in the fourth arm of the bridge, a variable inductance in said fourth arm of the bridge, a source of alternating current connected with two opposite vertices of the bridge, and an indicating device connected with the other two opposite vertices of the bridge, the variable inductance being adjustable into resonance with the temperature-responsive capacitance, the non-reactive portion of the bridge being correspondingly adjustable to produce a zero reading of the indicating device, and the bridge being calibrated in terms of temperature as a function of the adjustment of the variable inductance or the non-reactive portion of the bridge.

2. A temperature-measuring device of the Wheatstone-bridge type comprising three non-reactive impedances, one in each of three arms of the bridge, a temperature-responsive reactive impedance having a relatively high temperature coefficient of conductivity in the fourth arm of the bridge, a variable reactive impedance in said fourth arm of the bridge having a reactance of opposite sign to the sign of the reactance of the temperature-responsive reactive impedance, a source of alternating current connected with two opposite vertices of the bridge, and an indicating device connected with the other two opposite vertices of the bridge, the variable reactive impedance being adjustable into resonance with the temperature-responsive reactive impedance, the non-reactive portion of the bridge being correspondingly adjustable to produce a zero reading of the indicating device, and the bridge being calibrated in terms of temperature as a function of the adjustment of the variable reactive impedance or the non-reactive portion of the bridge.

3. A temperature-measuring device of the Wheatstone-bridge type comprising three non-reactive impedances, one in each of three arms of the bridge, one or more temperature-responsive, electrolytic cells having a relatively high temperature coefficient of conductivity in the fourth arm of the bridge, a variable reactive impedance in said fourth arm of the bridge having a reactance of opposite sign to the sign of the reactance of the reactive impedance of the electrolytic cell or cells, a source of alternating current connected with two opposite vertices of the bridge, and an indicating device connected with the other two opposite vertices of the bridge, the variable reactive impedance being adjustable into resonance with the reactive impedance of the electrolytic cell or cells, the non-reactive portion of the bridge being correspondingly adjustable to produce a zero reading of the indicating device, and the bridge being calibrated in terms of temperature as a function of the adjustment of the variable reactive impedance or the non-reactive portion of the bridge.

4. A temperature-measuring device of the Wheatstone-bridge type comprising three non-reactive impedances, one in each of three arms of the bridge, one or more sealed vessels each having a plurality of electrodes connected together in series by means of the electrodes in the fourth arm of the bridge, the vessel or vessels containing a temperature-responsive electrolyte or electrolytes having a relatively high temperature coefficient of conductivity to constitute it or them an electrolytic cell or cells, a variable reactive impedance in said fourth arm of the bridge having a reactance of opposite sign to the sign of the reactance of the reactive impedance of the electrolytic cell or cells, a source of alternating current connected with two opposite vertices of the bridge, and an indicating device connected with the other two opposite vertices of the bridge, the variable reactive impedance being adjustable into resonance with the reactive impedance of the electrolytic cell or cells, the non-reactive portion of the bridge being correspondingly adjustable to produce a zero reading of the indicating device, and the bridge being calibrated in terms of temperature as a function of the adjustment of the variable reactive impedance or the non-reactive portion of the bridge.

5. A temperature-measuring device of the Wheatstone-bridge type comprising three non-reactive impedances, one in each of three arms of the bridge, a sealed vessel having a plurality of electrodes connected in the fourth arm of the bridge, the vessel containing potassium chloride to constitute it an electrolytic cell, a variable inductance in said fourth arm of the bridge, a source of alternating current connected with two opposite vertices of the bridge, and an indicating device connected with the other two opposite vertices of the bridge, the variable inductance being adjustable into resonance with the reactive impedance of the electrolytic cell, the non-reactive portion of the bridge being correspondingly adjustable to produce a zero reading of the indicating device, and the bridge being calibrated in terms of temperature as a function of the adjustment of the variable inductance or the non-reactive portion of the bridge.

6. A temperature-measuring device comprising non-reactive impedance, a temperature-responsive capacitance connected therewith having a relatively high temperature coefficient of conductivity, a variable inductance connected in series with said temperature-responsive capacitance, a source of alternating current connected with the impedance, the capacitance and the inductance, the variable inductance being adjustable into resonance with the temperature-responsive capacitance, and the non-reactive impedance being correspondingly adjustable to balance changes in the resistance of the temperature-responsive capacitance, and means for indicating the balance, the device being calibrated in terms of temperature as a function of the adjustment of the variable inductance or the non-reactive impedance.

7. A temperature-measuring device comprising non-reactive impedance, a temperature-responsive reactive impedance connected therewith having a relatively high temperature coefficient of conductivity, a variable reactive impedance connected in series with said temperature-responsive reactive impedance and having a reactance of opposite sign to the sign of the reactance of the temperature-responsive reactive impedance, a source of alternating current connected with the impedances, the variable reactive impedance being adjustable into resonance with the temperature-responsive impedance, and the non-reactive impedance being correspondingly adjustable to balance changes in the resistance of the temperature-responsive reactive impedance, and means for indicating the balance, the device being calibrated in terms of temperature as a function of the adjustment of the variable reactive impedance or the non-reactive impedance.

8. A temperature-measuring device comprising non-reactive impedance, one or more temperature-responsive electrolytic cells connected therewith having a relatively high temperature coefficient of conductivity, a variable reactive impedance connected in series with said one or more temperature-responsive electrolytic cells and having a reactance of opposite sign to the sign of the reactance of the reactive impedance of the electrolytic cell or cells, a source of alternating current connected with the non-reactive impedance, the electrolytic cell or cells and the variable reactive impedance, the variable reactive impedance being adjustable into resonance with the reactive impedance of the electrolytic cell or cells, and the non-reactive impedance being correspondingly adjustable to balance changes in the resistance of the temperature-responsive electrolytic cells, and means for indicating the balance, the device being calibrated in terms of temperature as a function of the adjustment of the variable reactive impedance or the non-reactive impedance.

9. A temperature-measuring device comprising non-reactive impedance, one or more sealed vessels connected together and connected with the non-reactive impedance and each having a plurality of electrodes, the vessel or vessels containing a temperature-responsive electrolyte or electrolytes having a relatively high temperature coefficient of conductivity to constitute it or them an electrolytic cell or cells, a variable reactive impedance connected with the cell or cells and having a reactance of opposite sign to the sign of the reactance of the reactive impedance of the electrolytic cell or cells, a source of alternating current connected with the non-reactive impedance, the cell or cells and the variable reactive impedance, the variable reactive impedance being adjustable into resonance with the reactive impedance of the electrolytic cell or cells, and the non-reactive impedance being correspondingly adjustable to balance changes in the resistance of the temperature-responsive electrolyte or electrolytes, and means for indicating the balance, the device being calibrated in terms of temperature as a function of the adjustment of the variable reactive impedance or the non-reactive impedance.

10. A temperature-measuring device comprising non-reactive impedance, a sealed vessel having a plurality of electrodes connected therewith having a relatively high temperature coefficient of conductivity, the vessel containing potassium chloride to constitute it an electrolytic cell, a variable inductance connected in series with the vessel, a source of alternating current connected with the non-reactive impedance, the cell and the variable inductance, the variable inductance being adjustable into resonance with the reactive impedance of the electrolytic cell, and the non-reactive impedance being correspondingly adjustable to balance changes in the resistance of the potassium chloride, and means for indicating the balance, the device being calibrated in terms of temperature as a function of the adjustment of the variable inductance or the non-reactive impedance.

11. A temperature-measuring device comprising a Wheatstone-bridge having two portions each embracing two arms of the bridge, two impedances of like sign in the two arms of one of the portions of the bridge, a temperature-responsive capacitance having a relatively high temperature coefficient of conductivity and a variable reactive impedance in the other portion of the bridge, the bridge having a source of alternating current connected with two opposite vertices and an indicating device connected with the other two opposite vertices, the variable reactive impedance being adjustable to compensate for the temperature-responsive capacitance, the bridge having a non-reactive impedance that is correspondingly adjustable to produce a zero reading of the indicating device, and the bridge being calibrated in terms of temperature as a function of the adjustment of the variable reactive impedance or the non-reactive portion of the bridge.

12. A temperature-measuring device comprising a Wheatstone-bridge having two portions each embracing two arms of the bridge, two impedances of like sign in the two arms of one of the portions of the bridge, a temperature-responsive reactive impedance having a relatively high temperature coefficient of conductivity and a variable reactive impedance in the other portion of the bridge, the bridge having a source of alternating current connected with two opposite vertices and an indicating device connected with the other two opposite vertices, the variable reactive impedance being adjustable to compensate for the temperature-responsive reactive impedance, the bridge having a non-reactive impedance that is correspondingly adjustable to produce a zero reading of the indicating device, and the bridge being calibrated in terms of temperature as a function of the adjustment of the variable reactive impedance or the non-reactive portion of the bridge.

13. A temperature-measuring device comprising a Wheatstone-bridge having two portions each embracing two arms of the bridge, two impedances of like sign in the two arms of one of the portions of the bridge, one or more temperature-responsive, electrolytic cells having a relatively high temperature coefficient of conductivity and a variable reactive impedance in the other portion of the bridge, the bridge having a source of alternating current connected with two opposite vertices and an indicating device connected with the other two opposite vertices, the variable reactive impedance being adjustable to compensate for the reactive impedance of the electrolytic cell or cells, the bridge having a non-reactive impedance that is correspondingly adjustable to produce a zero reading of the indicating device, and the bridge being calibrated in terms of temperature as a function of the adjustment of the variable reactive or the non-reactive portion of the bridge.

14. A temperature-measuring device comprising a Wheatstone-bridge having two portions each embracing two arms of the bridge, two impedances of like sign in the two arms of one of the portions of the bridge, one or more sealed vessels each containing a temperature-responsive electrolyte or electrolytes having a relatively high temperature coefficient of conductivity to constitute it or them an electrolytic cell or cells, the electrolytic cell or cells and a variable reactive impedance being connected in the other portion of the bridge, the bridge having a source of alternating current connected with two opposite vertices and an indicating device connected with the other two opposite vertices, the variable reactive impedance being adjustable to compensate for the reactive impedance of the electrolytic cell or cells, the bridge having a non-reactive impedance that is correspondingly adjustable to produce a zero reading of the indicating device, and the bridge being calibrated in terms of temperature as a function of the adjustment of the variable reactive impedance or the non-reactive portion of the bridge.

15. A temperature-measuring device comprising a Wheatstone bridge having two portions each embracing two arms of the bridge, two impedances of like sign in the two arms of one of the portions of the bridge, a sealed vessel containing potassium chloride to constitute it an electrolytic cell, the electrolytic cell and a variable reactive impedance being connected in the other portion of the bridge, the bridge having a source of alternating current connected with two opposite vertices and an indicating device connected with the other two opposite vertices, the variable reactive impedance being adjustable to compensate for the reactive impedance of the electrolytic cell, the bridge having a non-reactive impedance that is correspondingly adjustable to produce a zero reading of the indicating device, and the bridge being calibrated in terms of temperature as a function of the adjustment of the variable reactive impedance or the non-reactive portion of the bridge.

PAUL S. BAUER.